United States Patent

[11] 3,555,955

[72] Inventor  Joseph R. Sahaida
              1475 Stallion, St. Louis, Mo.
[21] Appl. No. 853,798
[22] Filed     Aug. 28, 1969
[45] Patented  Jan. 19, 1971

[54] ATTACHMENT FOR WIND INSTRUMENT
     7 Claims, 6 Drawing Figs.
[52] U.S. Cl. .................................................. 84/397
[51] Int. Cl. .................................................. G10d 7/10
[50] Field of Search ...................................... 84/387,
                                                       397, 453

[56]              References Cited
              UNITED STATES PATENTS
   791,034   5/1905   Kreutzberg .................. 84/397
 2,137,992  11/1938   Natoli ........................... 84/397
 2,148,540   2/1939   Dibert ........................... 84/397

Primary Examiner—Richard B. Wilkinson
Assistant Examiner—John F. Gonzales
Attorney—Kingsland, Rogers, Ezell, Eilers and Robbins ABSTRACT: A cuplike attachment is releasably securable to one of the valve housings of a wind instrument to intercept and hold oil, saliva and other liquids that otherwise could drip onto the musician's clothing.

PATENTED JAN 19 1971
3,555,955
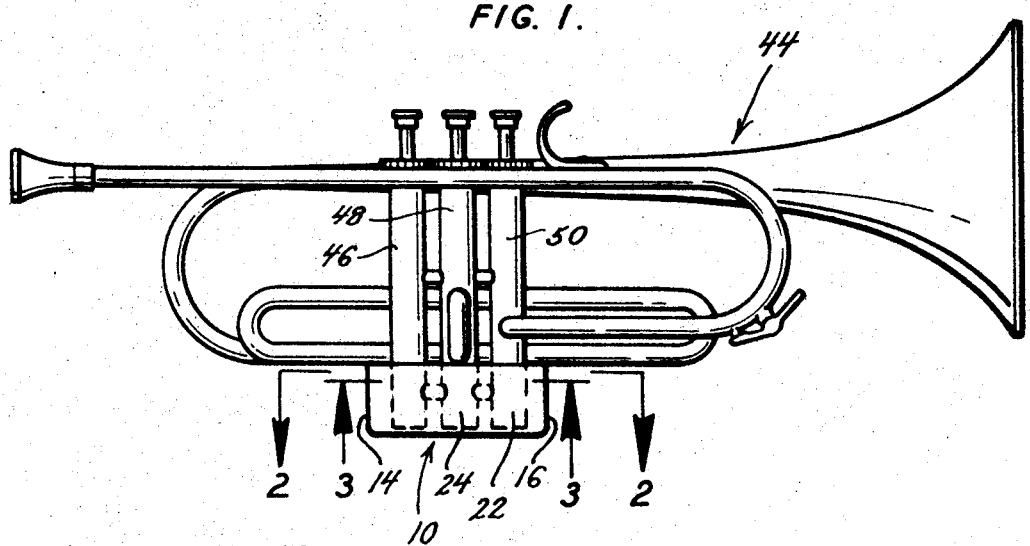
FIG. 1.
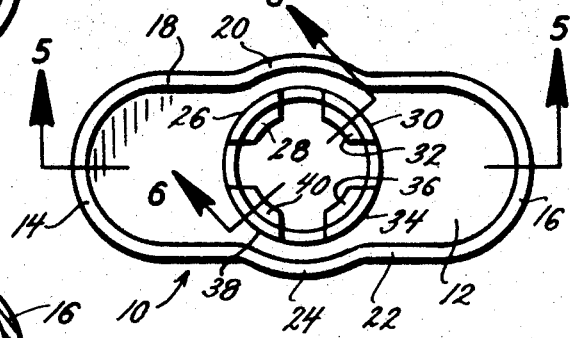
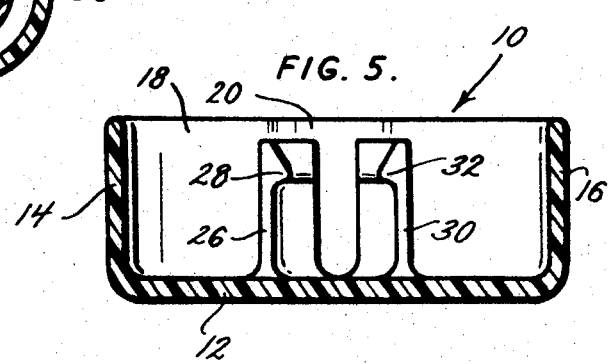

ATTACHMENT FOR WIND INSTRUMENT

This invention relates to improvements in Attachments For Wind Instruments. More particularly, this invention relates to improvements in cuplike attachments which are releasably securable to wind instruments to intercept and hold oil, saliva and other liquids that could drip from those instruments.

It is, therefore, an object of the present invention to provide an improved cuplike attachment which can be secured to a wind instrument to intercept and hold oil, saliva and other liquids that could drip from that instrument.

Cornettists, trumpeters, and other musicians who play wind instruments have had oil, saliva and other liquids drip from those instruments onto their clothing; and, in recognition of that fact, a number of cuplike attachments for wind instruments have been proposed to intercept and hold said oil, saliva or other liquids. Some of those cuplike attachments have been clumsy, other of those cuplike attachments have been bulky, and still other of those cuplike attachments have been expensive. It would be desirable to provide a cuplike attachment for a wind instrument that could intercept oil, saliva and other liquids which would drip from that instrument, and that was easy to install, was compact, and was inexpensive. The present invention provides such a cuplike attachment; and it is, therefore, an object of the present invention to provide a cuplike attachment for a wind instrument that can intercept oil, saliva and other liquids which drip from that instrument and that is simple to install, is compact, and is inexpensive.

The cuplike attachment provided by the present invention has a bottom wall, two arcuate end walls and two side walls; and that bottom wall, those end walls and those side walls coact to define a recess which can intercept and hold oil, saliva or other liquids. In addition, that cuplike attachment has resilient grippers which extend upwardly from the bottom wall of that cuplike attachment and which have housing-engaging portions that can releasably grip a valve housing of a wind instrument to releasably hold that cuplike attachment in position to intercept and hold any oil, saliva or other liquids which drip from that wind instrument. The resilient grippers are made so they bend rather easily; and the housing-engaging portions of those resilient grippers are made so the upper faces thereof act as inclined planes and so the inner faces thereof are smoothly rounded. The easily bendable nature of the resilient grippers coacts with the inclinations of the upper faces of the housing-engaging portions of those resilient grippers to enable the valve housing of a wind instrument to be readily telescoped into position between those resilient grippers; and the easily bendable nature of the resilient grippers and the inclinations of the upper faces of the housing-engaging portions of those resilient grippers and the smoothly rounded inner faces of those housing-engaging portions enable those resilient grippers to releasably engage and hold that valve housing without scratching or marring the finish on that valve housing. It is, therefore, an object of the present invention to provide a cuplike attachment for wind instruments that has a bottom wall, end walls and sidewalls which define a recess, that has resilient grippers which are made so they bend rather easily, and that has housing-engaging portions on those resilient grippers which have upper faces that act as inclined planes and which have smoothly rounded inner faces.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1 is a side elevational view of a trumpet and of one preferred embodiment of cuplike attachment that is provided by the present invention and that is associated with that trumpet, FIG. 2 is a sectional view, on a larger scale, through the trumpet of FIG. 1, and it is taken along the plane indicated by the line 2–2 in FIG. 1, FIG. 3 is a sectional view, on the scale of FIG. 2, through the cuplike attachment shown in FIG. 1, and it is taken along the plane indicated by the line 3–3 in FIG. 1, FIG. 4 is a plan view, on the scale of FIG. 2, of the cuplike attachment shown in FIG. 1, FIG. 5 is a sectional view, on the scale of FIG. 2, through the cuplike attachment shown in FIG. 1, and it is taken along the plane indicated by the line 5–5 in FIG. 4, and FIG. 6 is a sectional view, on the scale of FIG. 2, through the attachment shown in FIG. 1, and it is taken along the plane indicated by the line 6–6 in FIG. 4, Referring to the drawing in detail, the numeral 10 generally denotes one preferred embodiment of cuplike attachment that is made in accordance with the principles and teachings of the present invention. That attachment has a bottom wall 12, an end wall 14, an end wall 16, a sidewall 18 with an outwardly-bowed portion 20, and a sidewall 22 with an outwardly-bowed portion 24. As shown particularly by FIGS. 2—4, the end wall 14 and the end wall 16 are arcuate in form; and those end walls are spaced far enough apart to enable them to be disposed outwardly of the rearmost and foremost valve housings 46 and 50 of a trumpet 44. The sidewalls 18 and 22 are spaced far enough apart to enable them to be disposed outwardly of those foremost and rearmost valve housings. The outwardly-bowed portions 20 and 24 of the sidewalls 18 and 22, respectively, are in register with the central valve housing 48 of the trumpet 44. Those outwardly-bowed portions are spaced greater distances outwardly from the central valve housing 48 of the trumpet 44 than the sidewalls 18 and 22 are spaced outwardly of the rearmost and foremost valve housings 46 and 50. The bottom wall 12, the end walls 14 and 16, the sidewalls 18 and 22, and the outwardly-bowed portions 20 and 24 of those sidewalls coact to define a recess which can intercept and hold oil, saliva and other liquids that drip downwardly from one or more of the valve housings 46, 48 and 50 of the trumpet 44.

The numeral 26 denotes a gripper which extends upwardly in columnar fashion from the bottom wall 12 and which has a housing-engaging portion 28 at the inner face of the upper end thereof. The numeral 30 denotes a gripper which is similar to the gripper 26 and which has a housing-engaging portion 32 at the inner face of the upper end thereof. The numeral 34 denotes a gripper which is similar to the gripper 26 and which has a housing-engaging portion 36 at the inner face of the upper end thereof. The numeral 38 denotes a gripper which is similar to the gripper 26 and which has a housing-engaging portion 40 at the inner face of the upper end thereof. The upper ends of the housing-engaging portions 28, 32, 36 and 40, respectively, of the grippers 26, 30, 34 and 38 are disposed below the level of the upper edges of the end walls 14 and 16, of the sidewalls 18 and 22, and of the outwardly-bowed portions 20 and 24; and hence those housing-engaging portions and those grippers will be concealed from view during normal use of the cuplike attachment 10.

As shown particularly by FIGS. 2—4, the grippers 26, 30, 34 and 38 have arcuate outer faces; but, because those grippers are spaced apart, those outer faces define an incomplete circle. The grippers 26 and 34 are disposed at opposite ends of one diameter of that circle, and the grippers 30 and 38 are disposed at the opposite ends of a second diameter of that circle which is displaced 90° from that one diameter. The edges of the gripper 26 are spaced away from the edges of the grippers 30 and 38, the edges of the gripper 30 are spaced away from the edges of the grippers 26 and 34, the edges of the gripper 34 are spaced away from the edges of the grippers 30 and 38, and the edges of the gripper 38 are spaced away from the edges of the grippers 26 and 34 so each of those grippers can move freely relative to all of the other of those grippers. In addition, all of the grippers 26, 30, 34 and 38 are made relatively thin and of readily flexible material. As a result, the grippers 26, 30, 34 and 38 can readily yield to permit the housing-engaging portions thereof to telescope upwardly over the bottom of the central valve housing 48 of the trumpet 44.

In one preferred embodiment of the present invention, the thickness of each of the grippers 26, 30, 34 and 38 is only seventy thousandths of an inch, and the housing-engaging portion of each gripper is spaced seven-tenths of an inch above the upper surface of the bottom wall 12. The end walls 14 and 16, the sidewall 18 and its outwardly-bowed portion 20, and the sidewall 22 and its outwardly-bowed portion 24 of that preferred embodiment are one-tenth of an inch thick; and the bottom wall 12 is twelve-hundredths of an inch thick. The relatively thick end walls 14 and 16, sidewalls 18 and 22 and outwardly-bowed portions 20 and 24, and the still thicker bottom wall 12, enable the cuplike attachment 10 to resist deforming and destructive forces; but the thinner, spaced-apart grippers 26, 30, 34 and 38 are readily deformed. In addition, the upper faces of the housing-engaging portions 28, 32, 36 and 40 act as inclined planes; and hence those housing-gripping portions can easily be telescoped upwardly over the lower end of the central valve housing 48 of the trumpet 44 without scratching or marring the finish on that valve housing. The inner faces of the housing-engaging portions 28, 32, 36 and 40 are smoothly rounded; and, because those smoothly rounded inner faces—as well as the rest of the cuplike attachment 10—are made of a readily-yieldable material such as propylene, those smoothly rounded inner faces are readily yieldable and can be telescoped upwardly into engagement with and can be telescoped downwardly out of engagement with, the central valve housing 48 of the trumpet 44 without scratching or marring the finish on that valve housing.

In using the cuplike attachment 10, the musician will place that cuplike attachment adjacent the valve housings 46, 48 and 50 of the trumpet 44, and will align that cuplike attachment so the end wall 14 is adjacent the rearmost valve housing 46 or adjacent the foremost valve housing 50 and so the end wall 16 is adjacent the foremost valve housing 50 or the rearmost valve housing 46. At such time, the valve housing 48 will be in register with the incomplete circle defined by the grippers 26, 30, 34 and 38; and the musician will then move the cuplike attachment 10 toward the valve housings 46, 48 and 50 or will move those valve housings toward that cuplike attachment until the lower end of the valve housing 48 engages the upper faces of the housing-engaging portions 28, 32, 36 and 40 of the grippers 26, 30, 34 and 38, respectively. Those upper faces incline downwardly and inwardly and thus will act as inclined planes—thereby forcing the grippers 26, 30, 34 and 38 to bow outwardly and permit the bottom of the valve housing 48 to move downwardly into position between the housing-engaging portions 28, 32, 36 and 40. Because the inner faces of those housing-engaging portions are smoothly rounded, they readily permit the lower end of the valve housing 48 to move downwardly between them. At this time, the lower ends of the valve housings 46, 48 and 50 will be disposed below the level of the upper edges of, and will be concealed by, the end walls 14 and 16, the side walls 18 and 22, and the outwardly-bowed portions 20 and 24. As a result, the cuplike attachment 10 will provide a smooth and attractive appearance for the bottom of the cornet, trumpet or other wind instrument.

As the grippers 26, 30, 34 and 38 are bowed outwardly, restorative forces are developed within those grippers. Those restorative forces are not great enough to cause the housing-engaging portions 28, 32, 36 and 40 to scratch or mar the finish on the valve housing 48, but those restorative forces are great enough to enable those housing-engaging portions to hold the cuplike attachment 10 in assembled relation with the trumpet 44. At such time, that cuplike attachment will underlie all of the valve housings of the trumpet 44; and any oil, saliva or other liquid which tends to drip from any of those valve housings, while the musician is playing that trumpet, will be intercepted and held by that cuplike attachment. That oil, saliva, or other liquid thus will be kept from dripping onto the clothing or attire of the musician.

During any intermission in the musical program, the musician can check any amount of oil, saliva or other liquid that has been intercepted and held by the cuplike attachment 10; and he can then separate that cuplike attachment from the trumpet 44 by merely pulling downwardly on that cuplike attachment. That downward pull will enable the housing-engaging portions 28, 32, 36 and 40 to slide along, and to pass downwardly below, the lower end of the valve housing 48; and, at that time, the cuplike attachment 10 will be wholly freed from the trumpet 44. After emptying the cuplike attachment 10, the musician will again telescope the housing-engaging portions 28, 32, 36 and 40 upwardly over the lower end of the valve housing 48.

To make the cuplike attachment 10 attractive and appealing to the eye, a bright, extremely thin and extremely flexible film of metal can be deposited thereon. That film of metal must be so thin that it does not perceptibly affect the resilience of the grippers 26, 30, 34 and 38 and does not perceptibly affect the yieldability of the smoothly rounded inner faces of the housing-engaging portions 28, 32, 36 and 40.

The cuplike attachment 10 can be made in different sizes to accommodate trumpets and cornets of different sizes. Further, that cuplike attachment can be made in different configurations to accommodate the different configurations of valve housings of different wind instruments.

The cuplike attachment 10 does not interfere with the operation of the trumpet, cornet, or other wind instrument in any way. Further that cuplike attachment does not affect or change the manner in which the musician holds and plays that trumpet, cornet, or other wind instrument. In addition, by being metallized with a metal having the same color as the metal from which the trumpet, cornet, or other wind instrument is made, the cuplike attachment 10 does not detract from the overall appearance of that trumpet, cornet, or other wind instrument.

Whereas the drawing and accompanying description have shown and described a preferred embodiment of the present invention it should be apparent to those skilled in the art that various changes may be made in the form of the invention without affecting the scope thereof.

I claim:

1. A cuplike attachment, for a wind instrument that has a valve housing, which comprises a bottom wall, an end wall, a second end wall, a side wall and a second side wall which coact to define an open-top recess that can intercept and hold oil, saliva and other liquids, a plurality of grippers which are disposed inwardly of said side walls and which extend upwardly from said bottom wall in columnar fashion, said grippers having housing-engaging portions at the inner faces thereof, said grippers being spaced apart and said housing-engaging portions of said grippers being spaced apart so each gripper and its housing-engaging portion can move independently of the rest of said grippers and of the rest of said housing-engaging portions, said grippers being spaced apart to define a space into which the lower end of a valve housing of said wind instrument can be telescoped, said housing-engaging portions of said grippers being spaced apart to define a space which must be enlarged to accommodate the lower end of said valve housing, said housing-engaging portions having upper surfaces that respond to said lower end of said valve housing to move said housing-engaging portions far enough apart to enable said valve housing to move downwardly between said housing-engaging portions, said housing-engaging portions being formed and dimensioned to engage said valve housing without scratching or marring the finish on said valve housing.

2. A cuplike attachment, for a wind instrument that has a valve housing, which comprises a bottom wall, an end wall, a second end wall, a sidewall and a second sidewall which coact to define an open-top recess that can intercept and hold oil, saliva and other liquids, a plurality of grippers which are disposed inwardly of said sidewalls and which extend upwardly from said bottom wall in columnar fashion, said grippers having housing-engaging portions at the inner faces thereof, said grippers being spaced apart and said housing-engaging portions of said grippers being spaced apart so each gripper and its housing-engaging portion can move independently of the rest of said grippers and of the rest of said housing-engaging portions, said grippers being spaced apart to define a space into which the lower end of a valve housing of said wind instrument can be telescoped, said housing-engaging portions of said grippers being spaced apart to define a space which must be enlarged to accommodate the lower end of said valve housing, said housing-engaging portions having upper surfaces that respond to said lower end of said valve housing to move said housing-engaging portions far enough apart to enable said valve housing to move downwardly between said housing-engaging portions, said housing-engaging portions being formed and dimensioned to engage said valve housing without scratching or marring the finish on said valve housing, said upper surfaces of said housing-engaging portions inclining downwardly and inwardly to act as inclined planes, and the inner faces of said housing-engaging portions being smoothly rounded.

3. A cuplike attachment, for a wind instrument that has a valve housing, which comprises a bottom wall, an end wall, a second end wall, a sidewall and a second sidewall which coact to define an open-top recess that can intercept and hold oil, saliva and other liquids, a plurality of grippers which are disposed inwardly of said sidewalls and which extend upwardly from said bottom wall in columnar fashion, said grippers having housing-engaging portions at the inner faces thereof, said grippers being spaced apart and said housing-engaging portions at the inner faces thereof; said grippers being spaced apart and said housing-engaging portions of said grippers being spaced apart so each gripper and its housing-engaging portion can move independently of the rest of said grippers and of the rest of said housing-engaging portions, said grippers being spaced apart to define a space into which the lower end of a valve housing of said wind instrument can be telescoped, said housing-engaging portions of said grippers being spaced apart to define a space which must be enlarged to accommodate the lower end of said valve housing, said housing-engaging portions having upper surfaces that respond to said lower end of said valve housing to move said housing-engaging portions far enough apart to enable said valve housing to move downwardly between said housing-engaging portions, said housing-engaging portions being formed and dimensioned to engage said valve housing without scratching or marring the finish on said valve housing, said grippers and said housing-engaging portions thereof being made from a readily yieldable plastic material so said grippers can bend outwardly and so the inner faces of said housing-engaging portions can yield as said valve housing is moved downwardly into position between said housing-engaging portions.

4. A cuplike attachment, for a wind instrument that has a valve housing, which comprises a bottom wall, an end wall, a second end wall, a sidewall and a second sidewall which coact to define an open-top recess that can intercept and hold oil, saliva and other liquids, a plurality of grippers which are disposed inwardly of said sidewalls and which extend upwardly from said bottom wall in columnar fashion, said grippers having housing-engaging portions at the inner faces thereof, said grippers being spaced apart and said housing-engaging portions of said grippers being spaced apart so each gripper and its housing-engaging portion can move independently of the rest of said grippers and of the rest of said housing-engaging portions, said grippers being spaced apart to define a space into which the lower end of a valve housing of said wind instrument can be telescoped, said housing-engaging portions of said grippers being spaced apart to define a space which must be enlarged to accommodate the lower end of said valve housing, said housing-engaging portions having upper surfaces that respond to said lower end of said valve housing to move said housing-engaging portions far enough apart to enable said valve housing to move downwardly between said housing-engaging portions, said housing-engaging portions being formed and dimensioned to engage said valve housing without scratching or marring the finish on said valve housing, said grippers and said housing-engaging portions being disposed below the level of, and being normally concealed by, said end walls and said sidewalls.

5. A cuplike attachment, for a wind instrument that has a valve housing, which comprises a bottom wall, an end wall, a second end wall, a sidewall and a second sidewall which coact to define an open-top recess that can intercept and hold oil, saliva and other liquids, a plurality of grippers which are disposed inwardly of said sidewalls and which extend upwardly from said bottom wall in columnar fashion, said grippers having housing-engaging portions at the inner faces thereof, said grippers being spaced apart and said housing-engaging portions of said grippers being spaced apart so each gripper and its housing-engaging portion can move independently of the rest of said grippers and of the rest of said housing-engaging portions, said grippers being spaced apart to define a space into which the lower end of a valve housing of said wind instrument can be telescoped, said housing-engaging portions of said grippers being spaced apart to define a space which must be enlarged to accommodate the lower end of said valve housing, said housing-engaging portions having upper surfaces that respond to said lower end of said valve housing to move said housing-engaging portions far enough apart to enable said valve housing to move downwardly between said housing-engaging portions, said housing-engaging portions being formed and dimensioned to engage said valve housing without scratching or marring the finish on said valve housing, said sidewalls having outwardly-bowed portions in register with said valve housing.

6. A cuplike attachment, for a wind instrument that has a valve housing, which comprises a bottom wall, an end wall, a second end wall, a sidewall and a second sidewall which coact to define an open-top recess that can intercept and hold oil, saliva and other liquids, a plurality of grippers which are disposed inwardly of said sidewalls and which extend upwardly from said bottom wall in columnar fashion, said grippers having housing-engaging portions at the inner faces thereof, said grippers being spaced apart and said housing-engaging portions of said grippers being spaced apart so each gripper and its housing-engaging portion can move independently of the rest of said grippers and of the rest of said housing-engaging portions, said grippers being spaced apart to define a space into which the lower end of a valve housing of said wind instrument can be telescoped, said housing-engaging portions of said grippers being spaced apart to define a space which must be enlarged to accommodate the lower end of said valve housing, said housing-engaging portions having upper surfaces that respond to said lower end of said valve housing to move said housing-engaging portions far enough apart to enable said valve housing to move downwardly between said housing-engaging portions, said housing-engaging portions being formed and dimensioned to engage said valve housing without scratching or marring the finish on said valve housing, said end walls being arcuate and being disposed outwardly of valve housings at the front and rear of said wind instrument.

7. A cuplike attachment, for a wind instrument that has a valve housing, which comprises a bottom wall, an end wall, a second end wall, a sidewall and a second sidewall which coact to define an open-top recess that can intercept and hold oil, saliva and other liquids, a plurality of grippers which are disposed inwardly of said sidewalls and which extend upwardly from said bottom wall in columnar fashion, said grippers having housing-engaging portions at the inner faces thereof, said grippers being spaced apart and said housing-engaging portions of said grippers being spaced apart so each gripper and its housing-engaging portion can move independently of the rest of said grippers and of the rest of said housing-engaging portions, said grippers being spaced apart to define a space into which the lower end of a valve housing of said wind instrument can be telescoped, said housing-engaging portions of said grippers being spaced apart to define a space which must be enlarged to accommodate the lower end of said valve housing, said housing-engaging portions having upper surfaces that respond to said lower end of said valve housing to move said housing-engaging portions far enough apart to enable said valve housing to move downwardly between said housing-engaging portions, said housing-engaging portions being formed and dimensioned to engage said valve housing without scratching or marring the finish on said valve housing, said grippers being arcuate in plan and defining an incomplete circle, and said housing-engaging portions also being arcuate in plan.